(12) United States Patent
Arimilli et al.

(10) Patent No.: US 6,629,214 B1
(45) Date of Patent: *Sep. 30, 2003

(54) EXTENDED CACHE COHERENCY PROTOCOL WITH A PERSISTENT "LOCK ACQUIRED" STATE

(75) Inventors: Ravi Kumar Arimilli, Austin, TX (US); Lakshminarayana Baba Arimilli, Austin, TX (US); John Steven Dodson, Pflugerville, TX (US); Guy Lynn Guthrie, Austin, TX (US); William John Starke, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,186

(22) Filed: Nov. 9, 1999

(51) Int. Cl.[7] .......................... G06F 13/00; G06F 12/14
(52) U.S. Cl. ...................... 711/145; 711/141; 711/156
(58) Field of Search ................................. 711/141, 144, 711/145–148, 150–152, 156, 163, 168

(56) References Cited

U.S. PATENT DOCUMENTS

| | | | |
|---|---|---|---|
| 5,193,167 A | 3/1993 | Sites et al. ................. 395/425 |
| 5,301,337 A | * 4/1994 | Wells et al. ................. 710/200 |
| 5,339,443 A | 8/1994 | Lockwood | |
| 5,499,356 A | 3/1996 | Eckert et al. | |
| 5,706,464 A | 1/1998 | Moore et al. ................. 395/449 |
| 5,727,172 A | 3/1998 | Eifert et al. ................. 710/200 |
| 5,745,730 A | 4/1998 | Nozue et al. ................. 711/141 |
| 5,860,126 A | 1/1999 | Mittal | |
| 5,913,048 A | 6/1999 | Cheong et al. ............. 395/391 |
| 5,987,550 A | * 11/1999 | Shagam ....................... 711/147 |
| 6,047,316 A | * 4/2000 | Barton et al. ................. 709/216 |
| 6,148,300 A | 11/2000 | Singhal et al. ............. 711/145 |
| 6,374,331 B1 | * 4/2002 | Janakiraman et al. ....... 711/141 |

OTHER PUBLICATIONS

Craig, Travis S., *Queuing Spin Lock Algorithms to Support Timing Predictability*, In Proceeding of the Real–Time Systems Symposium, Dec. 1993, pp. 148–157, Seattle, Washington.

* cited by examiner

Primary Examiner—Do Hyun Yoo
Assistant Examiner—Yamir Encarnaciˊˊn
(74) Attorney, Agent, or Firm—Casimer K. Salys; Bracewell & Patterson, L.L.P.

(57) ABSTRACT

A multiprocessor data processing system requires careful management to maintain cache coherency. Conventional systems using a MESI approach sacrifice some performance with inefficient lock-acquisition and lock-retention techniques. The disclosed system provides additional cache states, indicator bits, and lock-acquisition routines to improve cache performance. The additional cache states allow cache state transition sequences to be optimized. In particular, the claimed system and method provides that a given processor, after acquiring a lock or reservation to a given cache line, will keep the lock, to make successive modifications to the cache line, instead of releasing it to other processors after making only one modification. By doing so, the overhead typically required to acquire a lock before making any cache line modification is eliminated for successive modifications.

16 Claims, 4 Drawing Sheets

| Line | CPUa | CPUb | CPUc |
|------|------|------|------|
| 1 | I | I | I |
| 2 | I | I | E |
| 3 | I | I | M1 |
| 4 | S | S | T |
| 5 | S | S | T |
| 6 | I | I | M2 |
| 7 | I | M3 | I |
| 8 | I | M1 | I |
| 9 | S | T | I |
| 10 | M3 | M2 | I |
| 11 | I | I | I |

Fig. 5

| Line | CPUa | CPUb | CPUc |
|------|------|------|------|
| 1 | I | I | I |
| 2 | I | I | E |
| 3 | I | I | M |
| 4 | I | T | S |
| 5 | T | S | S |
| 6 | I | I | M |
| 7 | T | T | S |
| 8 | I | S | S |
| 9 | T | M | I |
| 10 | T | S | I |
| ... | | | |
| 11 | T | S | I |
| 12 | I | M | I |
| 13 | T | S | I |
| 14 | M | I | I |

Fig. 4 (PRIOR ART)

EXTENDED CACHE COHERENCY PROTOCOL WITH A PERSISTENT "LOCK ACQUIRED" STATE

CROSS REFERENCE TO RELATED APPLICATIONS

The present application shares specification text and figures with the following applications, filed concurrently with the present application: application Ser. No. 09/437,185, "Improved Cache State Protocol For Shared Locks in a Multiprocessor System," application Ser. No. 09/437,187, "High Speed Lock Acquisition Mechanism With Time Parameterized Cache Coherency States," application Ser. No. 09/437,182 now abandoned, "High Speed Lock Acquisition Mechanism via a "One Shot" Modified State Cache Coherency Protocol," application Ser. No. 09/437,184, "An Extended Cache Coherency Protocol with a "Lock Released" State," application Ser. No. 09/437,183, and "An Extended Cache Coherency Protocol With a Modified Store Instruction Lock Release Indicator."

BACKGROUND OF THE INVENTION

1. Technical Field

The present invention generally relates to an improved data processing system and in particular to a system and method for improved cache management in a multiprocessor system. Still more particularly, the present invention relates to a system and method using specialized cache states and state sequences to provide improved cache coherency management in a multiprocessor data processing system.

2. Description of the Related Art

In order to enhance performance, state-of-the-art data processing systems often utilize multiple processors which concurrently execute portions of a given task. To further enhance performance, such multiple processor (MP) data processing systems often utilize a multi-level memory hierarchy to reduce the access time required to retrieve data from memory. A MP data processing system may include a number of processors, each with an associated level-one (L1) cache, a number of level-two (L2) caches, and a number of modules of system memory. Typically, the memory hierarchy is arranged such that each L2 cache is accessed by a subset of the L1 caches within the system via a local bus. In turn, each L2 cache and system memory module is coupled to a system bus or interconnect switch, such that an L2 cache within the MP data processing system may access data from any of the system memory modules coupled to the bus or interconnect switch.

Because each of the number of processors within a MP data processing system may modify data, MP data processing systems must employ a protocol to maintain memory coherence. For example, MP data processing systems utilizing PowerPC RISC processors utilize a coherency protocol having four possible states: modified (M), exclusive (E), shared (S), and invalid (I). The MESI state associated with each cache line (i.e., the line state) informs the MP data processing system what memory operations are required to maintain memory coherence following an access to that cache line. Depending upon the type of MP data processing system utilized, a memory protocol may be implemented in different ways. In snoop-bus MP data processing systems, each processor snoops transactions on the bus to determine if cached data has been requested by another processor. Based upon request addresses snooped on the bus, each processor sets the MESI state associated with each line of its cached data. In contrast, within a directory-based MP data processing system, a processor forwards memory requests to a directory at a lower level of memory for coherence ownership arbitration. For example, if a first processor (CPUa) requests data within a memory line that a second processor (CPUb) owns in exclusive state in CPUb's associated L1 cache, CPUa transmits a load request to the system memory module which stores the requested memory line. In response to the load request, the memory directory within the interrogated system memory module loads the requested memory line to CPUa and transmits a cross-interrogation message to CPUb. In response to the cross-interrogation message, CPUb will mark the requested cache line as shared in its associated L1 cache.

Among designers of MP data processing systems, there has been a recent interest in the use of load-reserve and store-conditional instructions which enable atomic accesses to memory from multiple processors while maintaining memory coherence. For example, load-reserve and store-conditional instructions on a single word operand have been implemented in the PowerPC RISC processor instruction set with the LARWX and STCWX instructions, respectively, which will be referenced as LARX and STCX. In MP data processing systems which support LARX and STCX or analogous instructions, each processor within the system includes a reservation register. When a processor executes a LARX to a variable, the processor, known as the requesting processor, loads the contents of the address storing the variable from the requesting processor's associated L1 cache into a register and the address of the memory segment containing the variable into the reservation register. Typically, the reservation address indexes a segment of memory, called a reservation granule, having a data width less than or equal to the requesting processor's L1 cache line. The requesting processor is then said to have a reservation with respect to the reservation granule. The processor may then perform atomic updates of the reserved variable utilizing store-conditional instructions.

When a processor executes a STCX to a variable contained in a reservation granule for which the processor has a reservation, the processor stores the contents of a designated register to the variable's address and then clears the reservation. If the processor does not have a reservation for the variable, the instruction fails and the memory store operation is not performed. In general, the processor's reservation is cleared if either a remote processor stores data to the address containing the reserved variable or the reserving processor executes a STCX instruction. Additional background information about load-reserve and store-conditional instructions in a multiprocessor environment may be found, for example, in Sites, et al., U.S. Pat. No. 5,193,167, which is hereby incorporated by reference.

FIG. 3 shows a flowchart of a process to complete a store operation to a cache in a multiprocessor environment, where a lock on the wordline must be acquired. When the store is to be done, the address of the wordline is loaded with a LARX (step 300). A comparison check is performed (step 305) to determine if a lock was acquired for that wordline (step 310). If the lock was acquired, we attempt a store (step 345), described below.

Assuming, however, that the lock was not acquired, because it is owned by another processor, the status register for that line is loaded (step 315), and the status of the wordline is checked (step 320) to determine when the lock is released, As long as the lock is not released (step 325), the process loops back to step 315 to keep checking.

When the lock is finally released (step 325), the processor again tries to acquire a lock. The address of the wordline is loaded with a LARX (step 330), and a comparison check is performed (step 335) to determine if a lock was acquired for that wordline (step 335). If the lock was acquired, the processor attempts a store (step 345); if not, the processor begins the process over again at step 300.

When the lock is acquired, the store is attempted (step 345). If it is successful (step 350), the lock is released, and the processor resumes its normal programming. If, however, the store is unsuccessful, this will mean that we lost the lock; the process restarts at step 300).

This process is, of course, very expensive in terms of processor cycles. Because of the imbedded loops necessary to make sure that a lock is acquired before the store, a STCX generally consumes about 100 cycles.

Typically, MP data processing systems which include a memory hierarchy track the reservation state of each reservation granule utilizing a reservation protocol similar in operation to the memory coherence protocol discussed above. Such MP data processing systems generally record each processor's reservation at the system memory (main store) level. For example, each main memory module may include a reservation register for each processor that indicates which reservation granule, if any, is reserved by the associated processor. Because processor reservations are maintained at the system memory level, each execution of an instruction which affects the reservation status of a reserved granule requires that a reservation message be transmitted to the system memory module containing the target reservation granule. These reservation messages slow overall MP system performance because of the additional traffic they create on the interconnect switch or system bus and because of delays in determining if a requesting processor may successfully execute a STCX.

Consequently, it would be desirable to provide an improved method and system for memory updates in a MP data processing system in which reservations may be resolved at higher levels within the memory hierarchy, thereby minimizing reservation messaging and enhancing MP data processing system performance.

SUMMARY OF THE INVENTION

It is therefore one object of the present invention to provide an improved data processing system.

It is another object of the present invention to provide a system and method for improved cache management in a multiprocessor system.

It is yet another object of the present invention to provide a system and method using specialized cache states and state sequences to provide improved cache coherency management in a multiprocessor data processing system.

The foregoing objects are achieved as is now described.

A multiprocessor data processing system requires careful management to maintain cache coherency. Conventional systems using a MESI approach sacrifice some performance with inefficient lock-acquisition and lock-retention techniques. The disclosed system provides additional cache states, indicator bits, and lock-acquisition routines to improve cache performance. The additional cache states allow cache state transition sequences to be optimized. In particular, the claimed system and method provides that a given processor, after acquiring a lock or reservation to a given cache line, will keep the lock, to make successive modifications to the cache line, instead of releasing it to other processors after making only one modification. By doing so, the overhead typically required to acquire a lock before making any cache line modification is eliminated for successive modifications.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a state transition table as in conventional multiprocessor systems; and FIG. 5 is a state transition table in accordance with a preferred embodiment of the invention.

DETAILED DESCRIPTION OF THE PREFERRED EMBODIMENT

Figure 1:
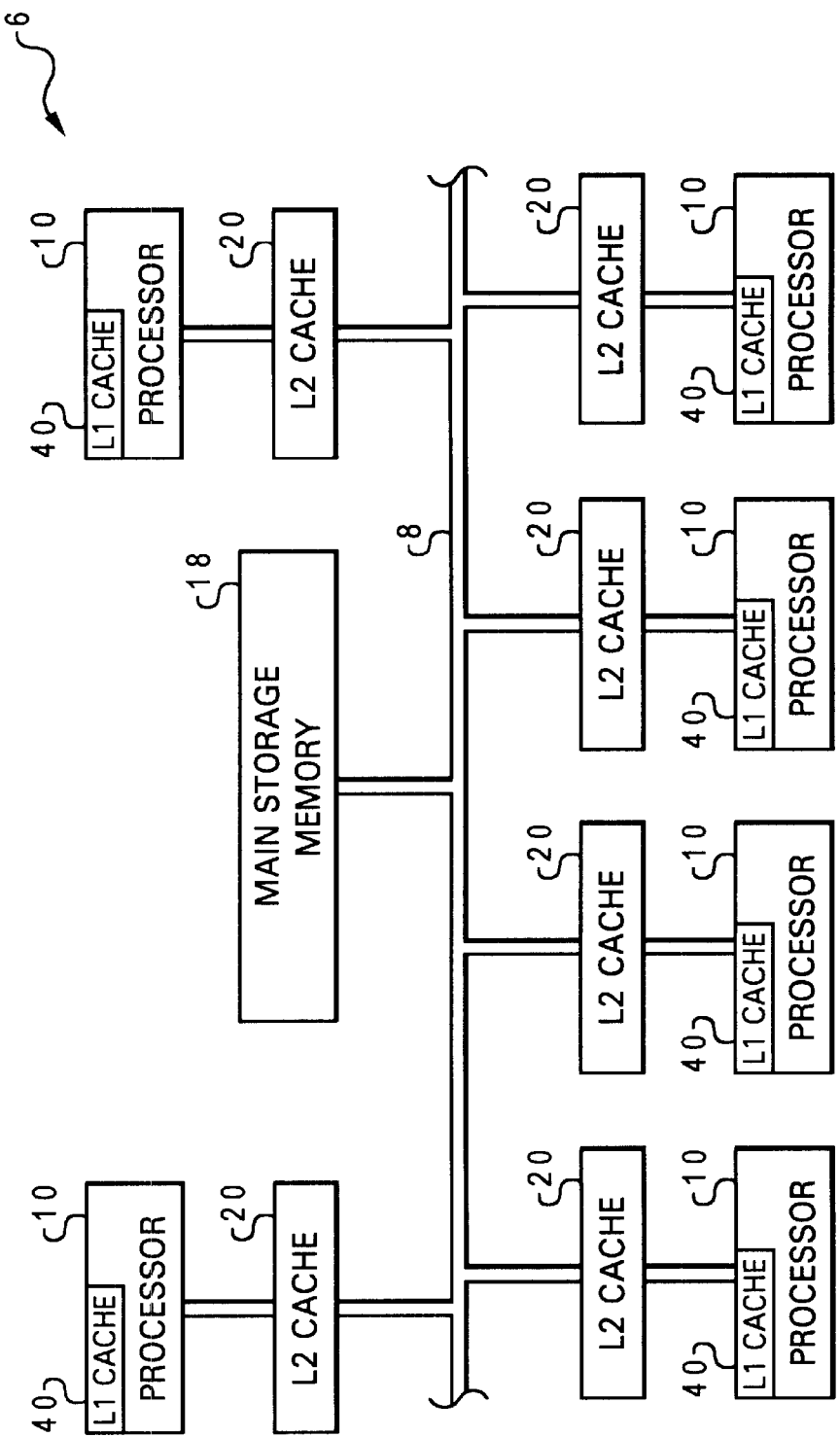
FIG. 1 depicts a multiprocessor data processing system in accordance with a preferred embodiment of the present invention.

With reference now to the figures and in particular with reference to FIG. 1, there is depicted a high level block diagram illustrating a multiprocessor data processing system 6 which may be utilized to implement the method and system of the present invention. As illustrated, multiprocessor data processing system 6 may be constructed utilizing multiscalar processors 10 which are each coupled to system memory 18 utilizing bus 8. In a tightly coupled symmetric multiprocessor system, such as multiprocessor data processing system 6, each processor 10 within multiprocessor data processing system 6 may be utilized to read from and write to memory 18. Thus, systems and interlocks must be utilized to ensure that the data and instructions within memory 18 remain coherent.

As illustrated within FIG. 1, and as will be explained in greater detail herein, each processor 10 within multiprocessor data processing system 6 includes a level 1 (L1) cache memory 40 which may be utilized to efficiently and temporarily access and store selected instructions or data from system memory 18 via level two (L2) cache memory 20. In view of the fact that each cache memory constitutes a memory space, it is important to maintain coherency among each L1 cache memory 40 and L2 cache memory 20 within multiprocessor data processing system 6 in order to assure accurate operation thereof.

Figure 2:
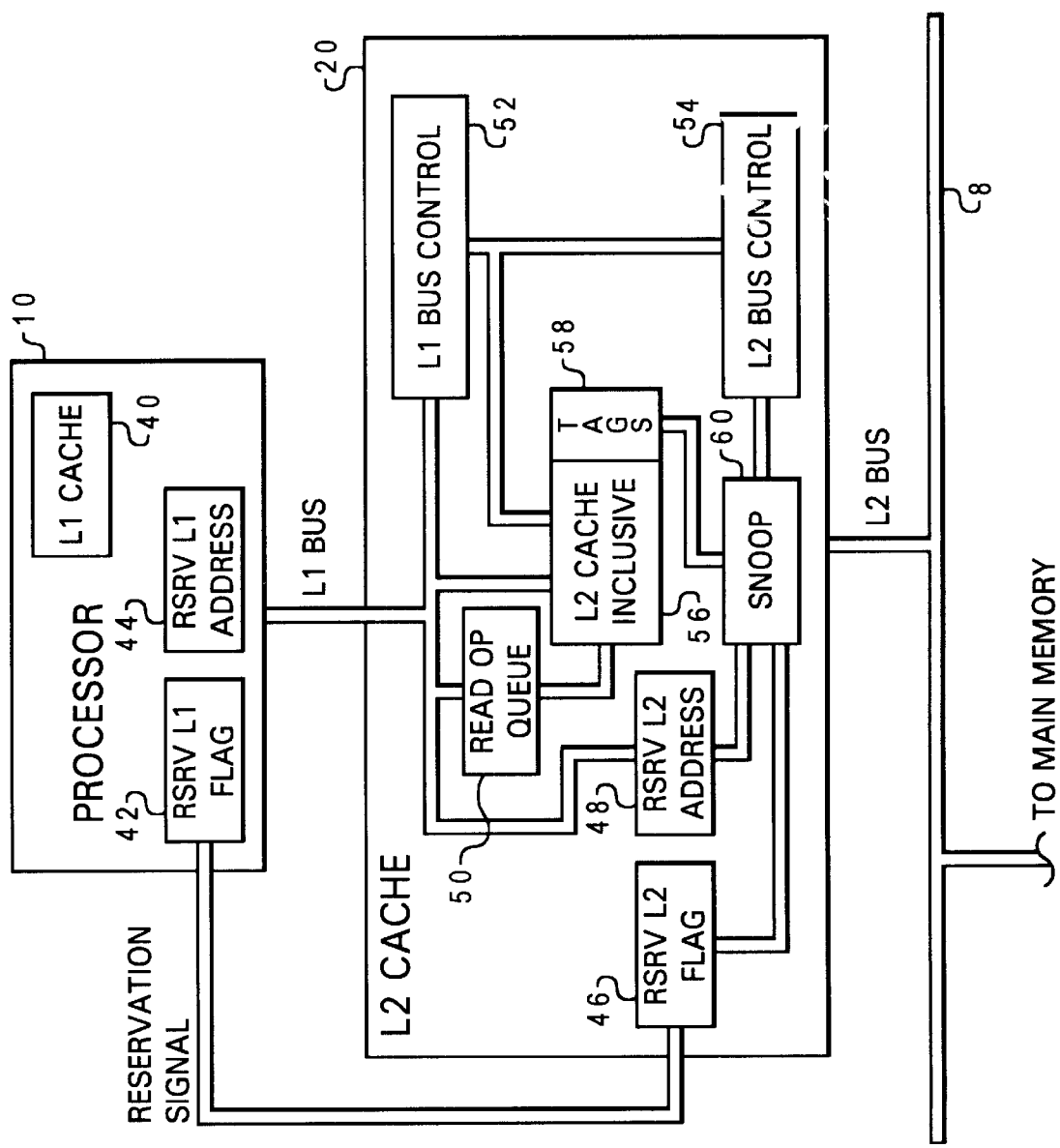
FIG. 2 is a high level block diagram of a multilevel cache system within multiprocessor data processing system in accordance with a preferred embodiment of the present invention.

Referring now to FIG. 2, there is depicted a high level block diagram of a multilevel cache system within multiprocessor data processing system 6 of FIG. 1, which may be utilized to implement the method and system of the present invention. As illustrated, processor 10 is coupled to bus 8 via a level two (L2) cache 20. Level one (L1) cache 40 within processor 10 is utilized to temporarily store a small number of instructions or data which are utilized by processor 10 most frequently. The sizing and operation of cache memories is a well recognized specialty within the data processing art and is not addressed here.

In accordance with an important feature of the present invention, each time an atomic memory reference is attempted within processor 10, a reservation flag 42 is set within processor 10. Those skilled in the art will appreciate that this may simply constitute a single binary digit which is set to a value of either zero or one. This reservation signal is communicated to level two (L2) cache 20 and stored within a L2 reservation flag 46 therein. The setting of this reservation flag within the level two (L2) cache permits an indication that a valid reservation is pending within processor 10. In order to achieve an atomic memory reference it will thus be necessary to advise processor 10 of any attempted writes to data which may occur at the reservation address.

A straightforward technique for accomplishing this filtering would be the transmittal from processor 10 to level two (L2) cache 20 of the reservation address; however, those skilled in the art will appreciate that this will constitute a severe degradation in processor performance. Thus, the address for which the reservation is pending, for cacheable data, is only maintained at reservation address 44 within processor 10. In a manner which will be explained in greater detail herein, level two (L2) cache 20 may be utilized to monitor the activities of other processors within multiprocessor data processing system 6 by means of the so-called "snoop" protocol, graphically depicted at reference numeral 60. By "snooping" bus 8, level two (L2) cache 20 may transmit to processor 10 those attempted bus activities which may alter data at a reservation address.

Of course, certain data within multiprocessor data processing system 6 may be cache "inhibited," that is, data which may not be stored within cache memory. In such a circumstance the setting of a reservation flag for that data will necessarily result in a "miss" within level one (L1) cache 40 and an attempted read of that data from level two (L2) cache 20. In view of the fact that the data is cache inhibited, the address will be passed to level two (L2) cache 20 for a read operation and thus, the monitoring of activities which may alter the data at the reservation address is a simple affair, in the case of cache inhibited data. In such a situation, the reservation address may be transmitted from processor 10 to reservation address 48 within level two (L2) cache 20. Thereafter, snoop protocol 60 may be simply utilized to monitor activities of the other processors within multiprocessor data processing system 6 which may alter the data at that reservation address.

As depicted within FIG. 2, level two (L2) cache 20 also preferably includes a read operation queue 50 which may be utilized to temporarily store read operations passed from level one (L1) cache 40 to level two (L2) cache 20. Additionally, level one (L1) bus control 52 and level two (L2) bus control 54 may be utilized to control the communication of data between level one (L1) cache 40 and level two (L2) cache 20 and level two (L2) cache 20 and bus 8, respectively. Further details of a system as described above may be found in U.S. Pat. No. 5,706,464, which is hereby incorporated by reference.

In conventional systems, each CPU (10 in FIG. 1) will maintain the current status of the cache. As an illustrative example, consider a system as in FIG. 1 with three processors: CPUa, CPUb, and CPUc. FIG. 4 shows MESI state table typical in conventional systems. Note that the line numbers are purely to aid in the discussion below. In this figure, S=a shared data state, E=exclusive ownership, M=a modified state, I=an invalid state, and T=a shared-ownership state.

In FIG. 4, in line 1, the cache of each CPU is assumed to be in state I (hereinafter, references to the state of a CPU's cache will simply reference the CPU itself, e.g., in line 1, each CPU's cache is assumed to be in state I). In line 2, CPUc has loaded the cache with a memory line, and has exclusive ownership of the line. CPUc then performs a STCX, so it moves to a modified state in line 3.

Next, CPUb takes ownership of the line, and is sharing the data with CPUc. The "T" state here for CPUb indicates that it owns the line, but other processors are sharing it. Next, when CPUa takes ownership of the line in line 5, CPUb and CPUc move to a shared state.

Now assume that CPUc performs a STCX. In this case, CPUc will move to a modified state, and CPUa and CPUb are invalidated, as shown in line 6. It should be noted here that the store by CPUc takes 100 cycles or more, as described above, to perform the snoop and the store.

Next, CPUb takes ownership of the line, and is sharing the data with CPUc, as in line 7. Next, when CPUa takes ownership of the line in line 8, CPUb and CPUc move to a shared state.

Now assume that CPUb performs a STCX. In this case, CPUb will move to a modified state, and CPUa and CPUc are invalidated, as shown in line 9. Note that the store by CPUb takes 100 cycles or more, as described above, to perform the snoop and the store.

Next, CPUa takes ownership of the line, and is sharing the data with CPUb, as in line 10. The three processors may remain in this state for some time, as CPUa and CPUb continue to read the same line without modifying it, as shown in line 11.

Now assume that CPUb performs a STCX. In this case, CPUb will move to a modified state, and CPUa and CPUc are invalidated, as shown in line 12. Note that the store by CPUb takes 100 cycles or more, as described above, to perform the snoop and the store.

Again, CPUa takes ownership of the line, and is sharing the data with CPUb, as in line 13. When CPUa performs a STCX, CPUa will move to a modified state, and CPUb and CPUc are invalidated, as shown in line 12. Again, the store by CPUa takes 100 cycles or more, as described above, to perform the snoop and the store.

Figure 3:
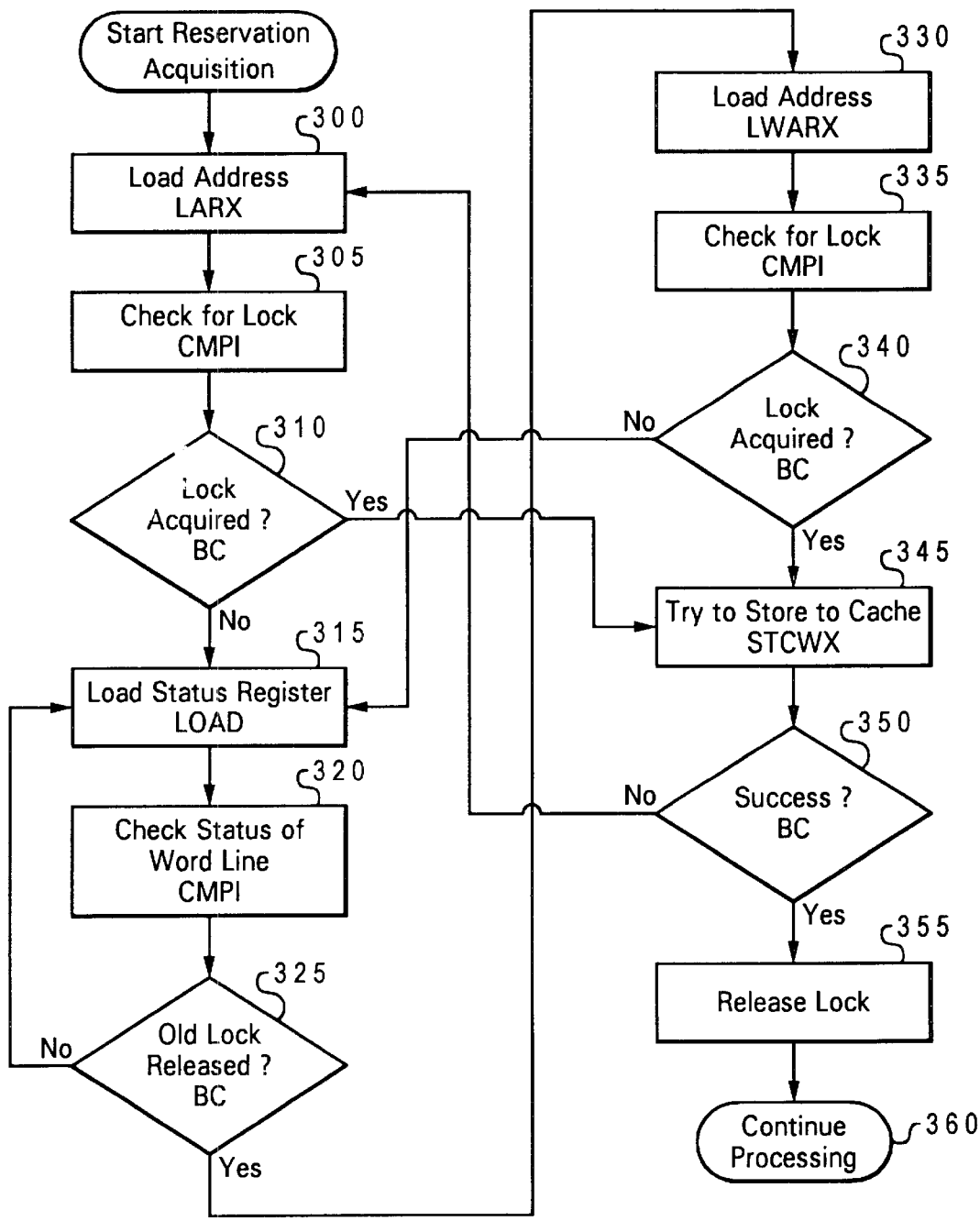
FIG. 3 is a flowchart of a conventional lock-acquisition process.

Note that the conventional system illustrated by FIG. 3 shows several problems. First, note the case illustrated in lines 9–12. In this case, CPUb modifies the cache twice, each time requiring a large snoop-and-store overhead, while no other processor has written that line in the interim. However, since CPUb gave up its lock, and CPUa took ownership, CPUb was forced to reacquire the lock, with the resultant overhead.

A similar problem can be seen in examining lines 13–14. In this case it can be seen that CPUb modifies the cache in line 12, CPUa and CPUb then share then cache, and then CPUa modifies it. Here, it should be clear that both CPUa and CPUb will probably require repeated STCX operations to the same cache line; instead of requiring that each STCX operation incur the overhead of a lock-acquisition process, it would be preferable if one processor could perform several modifications without giving up the lock.

Next, note that the conventional process to acquire the lock, as described above, can be very expensive. While a figure of 100 cycles is typically used, in many cases, the time spent trying to acquire a lock (in a conventional system as in FIG. 3) may be much higher.

The preferred embodiment presents several improvements over conventional systems. Three new processor states are introduced, as described below, a lock release flag bit is added, and the code sequence for cache coherency and lock acquisition is optimized.

FIG. 5 shows an optimized state table incorporating new states M1, M2, and M3. Note that the line numbers are purely to aid in the discussion below. In this figure, S=a shared data state, E=exclusive ownership, I=an invalid state, and T=a shared-ownership state. The new states are:

M1 A speculative lock-acquired modified state. Until released, no other CPU may take ownership of the cache line.

M2 A modified state which indicates that the speculative lock is released.

M3 A modified state of fixed duration, which prevents "bouncing" between two CPUs.

In FIG. 5, in line 1, the cache of each CPU is assumed to be in state I. In line 2, CPUC has loaded the cache with a memory line, and has exclusive ownership of the line.

CPUc then performs a STCX, so it moves to a modified state in line 3. Note that here, the modified state is new state M1. This new state acquires the lock to modify the cache line, modifies it, then prevents any other CPU from taking ownership. Other CPUs are invalidated.

Next, CPUb loads the cache line, in line 4. Instead of granting CPUb ownership (T state) and moving CPUc to a shared state (S state), CPUc retains ownership, by moving to T state, and allows CPUb to share the line (S state). When CPUa tries to take ownership in line 5, the same thing happens, leaving CPUc in T state, with CPUa and CPUb in S state.

In line 6 of FIG. 5, CPUc performs another STCX, and transitions to new modified state M2. Here, the store and transition is very fast; since CPUc had never given up ownership of the cache line, the snoop routine is not necessary, saving 100 cycles or more. The M2 state also includes a lock-release, so that another CPU can hereafter take the cache line. Since a STCX has been performed, all other CPUs are invalidated.

Next, in line 7 of FIG. 5, CPUb takes ownership of the cache line, and goes into new state M3. State M3 does not actually modify the cache line, but merely holds ownership of the cache line for a fixed amount of time, while forcing the other processors to remain in Invalid state. This action prevents CPUa or CPUc from trying to acquire the cache line and causing the "bouncing" effect described above.

CPUb may now execute a STCX and move directly into state M1, as shown in line 8; this is a very fast transition with no snooping required, since the previous M3 state held the other CPUs in an Invalid state. Again, at least 100 cycles are saved. Of course, since a STCX has occurred, other CPUs have been held in Invalid state.

As described above with relation to CPUc in lines 3–6, from the M1 state, CPUb retains ownership of the cache line but allows other processors, here CPUa, to share it, as in line 9. Next, CPUb executes a STCX command which includes a lock release, and moves into state M2, as shown in line 10.

Finally, in line 11, another CPU, here CPUa, can take ownership of the cache line. When it does so, it again goes into state M3 to allow it to make the stores it needs to without risking an alternating ownership bounce between different processors.

Of course, while the above exemplary state tables have been drawn to a three-processor system, the described state transitions apply to systems with any number of processors.

The three new cache states described above are advantageous when used alone, but provide the greatest increase in efficiency when used in combination.

In the preferred embodiment, a flag bit is added to the store/STCX command to indicate that it is a lock release. In this way, it is easy to differentiate between state M2 and other store functions. By doing so, the snoop routine can be eliminated or shortened, since it is explicit when a CPU has given up its lock on a cache line.

Further, in the preferred embodiment, the snoop routine is cut short any time it takes more than 100 cycles. If a CPU attempts a store, and has not successfully acquired a lock on the cache line within 100 cycles, it gives up. The CPU may then continue processing other threads or performing other functions, and can retry acquiring the cache line after a delay period.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method, in a data processing system including a plurality of processors and a multiple-level memory hierarchy maintaining coherency using a coherency protocol, said method comprising:

setting a reservation indicator associated with a particular processor among the plurality of processors which specifies a selected address for which the particular processor holds a reservation;

maintaining the reservation address of the particular processor only within memory units that are at or above a specified level within the memory hierarchy, wherein the specified level is a highest level within the memory hierarchy at which memory units associated with the processor store data associated with the selected address;

said particular processor modifying contents of a memory unit corresponding to the selected address by executing a store-conditional instruction targeting the selected address while the particular processor holds the reservation; and after modification of the contents of the memory unit corresponding to the selected address by the particular processor, allowing other ones of the plurality of processors to read the modified contents of the memory unit corresponding to the selected address, while retaining the reservation of the particular processor for the selected address.

2. The method of claim 1, further comprising the step of storing the selected address within a reservation register in conjunction with a bit indicating whether the particular processor holds a reservation for the selected address.

3. The method of claim 1, further comprising the step of determining if a reservation indicator within the associated memory unit indicates that the particular processor has a reservation for the selected address.

4. The method of claim 1, further comprising the step of, before setting a reservation indicator, determining if any other processor holds a reservation for the selected address.

5. The method of claim 1, further comprising the step of allowing other ones of the processors to acquire a reservation with respect to the selected address only after execution by the particular processor of an explicit lock-release instruction.

6. The method of claim 5, and further comprising the particular processor executing a store-conditional instruction that includes a field identifying the store-conditional instruction as a lock-release instruction.

7. A system for supporting memory updates in a data processing system including a plurality of processors and a multiple-level memory hierarchy maintaining coherency using a coherency protocol, said system comprising:

means for setting a reservation indicator associated with a particular processor among the plurality of processors which specifies a selected address for which the particular processor holds a reservation;

means for maintaining the reservation address of the particular processor only within memory units that are at or above a specified level within the memory hierarchy, wherein the specified level is a highest level within the memory hierarchy at which memory units associated with the processor store data associated with the selected address;

means for modifying contents of a memory unit corresponding to the selected address by executing a store-conditional instruction targeting the selected address while the particular processor holds the reservation; and means for allowing other ones of the processors to read the modified contents of the memory unit corresponding to the selected address after modification of the contents of the memory unit corresponding to the selected address, while retaining the reservation of the particular processor for the selected address.

8. The system of claim 7, further comprising means for storing the selected address within a reservation register in conjunction with a bit indicating whether the particular processor holds a reservation for the selected address.

9. The system of claim 7, further comprising means for determining if a reservation indicator within the associated memory unit indicates that the particular processor has a reservation for the selected address.

10. The system of claim 7, further comprising means for, before setting a reservation indicator, determining if any other processor holds a reservation for the selected address.

11. The system of claim 7, further comprising means for allowing other ones of the processors to acquire a reservation with respect to the selected address only after execution by the particular processor of an explicit lock-release instruction.

12. The system of claim 11, wherein said lock-release instruction comprises a store-conditional instruction including a field identifying the store-conditional instruction as a lock-release instruction.

13. A system, comprising:

a cache hierarchy; and at least one processor coupled to the cache hierarchy, said processor including:

reservation circuitry that specifies a selected address for which the processor holds a reservation, wherein the selected address is maintained as a reservation address only within memory units that are at as above a specified level within the cache hierarchy, wherein the specified level is a highest level within the cache hierarchy at which memory units associated with the processor store data associated with the selected address; and execution resources that execute a store-conditional instruction to modify contents of the cache hierarchy corresponding to the selected address while the particular processor holds the reservation; and wherein the cache hierarchy includes control circuitry that allows other processors to read the modified contents at the selected address after modification of the contents, while retaining the reservation of the processor for the selected address.

14. The system of claim 13, wherein said system comprises a data processing system including a plurality of processors and an interconnect coupling the plurality of processors, wherein the plurality of processors includes said at least one processor.

15. The system of claim 13, wherein said control circuitry allows other ones of the processors to acquire a reservation with respect to the selected address only after execution by the particular processor of an explicit lock-release instruction.

16. The system of claim 15, wherein said lock-release instruction comprises a store-conditional instruction including a field identifying the store-conditional instruction as a lock-release instruction.

\* \* \* \* \*